(12) United States Patent
Al Sheikh et al.

(10) Patent No.: US 11,709,679 B2
(45) Date of Patent: Jul. 25, 2023

(54) PROVIDING LOAD ADDRESS PREDICTIONS USING ADDRESS PREDICTION TABLES BASED ON LOAD PATH HISTORY IN PROCESSOR-BASED SYSTEMS

(71) Applicant: QUALCOMM Incorporated, San Diego, CA (US)

(72) Inventors: Rami Mohammad Al Sheikh, Morrisville, NC (US); Raguram Damodaran, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 511 days.

(21) Appl. No.: 15/087,069

(22) Filed: Mar. 31, 2016

(65) Prior Publication Data

US 2017/0286119 A1 Oct. 5, 2017

(51) Int. Cl.
*G06F 9/38* (2018.01)

(52) U.S. Cl.
CPC .................. *G06F 9/3832* (2013.01)

(58) Field of Classification Search
CPC ..... G06F 9/3832; G06F 9/3842; G06F 9/3844
See application file for complete search history.

(56) References Cited

U.S. PATENT DOCUMENTS

| 5,287,467 | A | 2/1994 | Blaner et al. |
| 5,377,336 | A | 12/1994 | Eickemeyer et al. |
| 5,941,981 | A | 8/1999 | Tran |
| 6,108,775 | A | 8/2000 | Shiell et al. |
| 6,230,260 | B1 | 5/2001 | Luick |
| 6,438,673 | B1 | 8/2002 | Jourdan et al. |

(Continued)

FOREIGN PATENT DOCUMENTS

| CN | 104049938 A | 9/2014 |
| CN | 104335168 A | 2/2015 |

(Continued)

OTHER PUBLICATIONS

Sheikh et al., "Load Value Prediction via Path-based Address Prediction: Avoiding Mispredictions due to Conflicting Stores", Oct. 2017, pp. 423-435.*

(Continued)

*Primary Examiner* — David J. Huisman
(74) *Attorney, Agent, or Firm* — W&T/Qualcomm

(57) ABSTRACT

Aspects disclosed in the detailed description include providing load address predictions using address prediction tables based on load path history in processor-based systems. In one aspect, a load address prediction engine provides a load address prediction table containing multiple load address prediction table entries. Each load address prediction table entry includes a predictor tag field and a memory address field for a load instruction. The load address prediction engine generates a table index and a predictor tag based on an identifier and a load path history for a detected load instruction. The table index is used to look up a corresponding load address prediction table entry. If the predictor tag matches the predictor tag field of the load address prediction table entry corresponding to the table index, the memory address field of the load address prediction table entry is provided as a predicted memory address for the load instruction.

23 Claims, 9 Drawing Sheets

(56) References Cited

U.S. PATENT DOCUMENTS

| | | | |
|---|---|---|---|
| 6,868,491 | B1 | 3/2005 | Moore |
| 6,976,147 | B1 | 12/2005 | Isaac et al. |
| 7,430,650 | B1 | 9/2008 | Ross |
| 7,856,548 | B1 * | 12/2010 | Nelson ................ G06F 9/3832 712/220 |
| 9,367,468 | B2 | 6/2016 | Sassone et al. |
| 9,594,566 | B1 | 3/2017 | Alexander et al. |
| 10,437,595 | B1 | 10/2019 | Kanapathipillai et al. |
| 2002/0023204 | A1 * | 2/2002 | Barowski ................ G06F 9/383 712/239 |
| 2002/0091915 | A1 | 7/2002 | Parady |
| 2002/0124156 | A1 | 9/2002 | Yoaz et al. |
| 2008/0034187 | A1 | 2/2008 | Stempel et al. |
| 2008/0244232 | A1 | 10/2008 | Sherman et al. |
| 2010/0049912 | A1 * | 2/2010 | Mylavarapu .......... G06F 1/3203 711/108 |
| 2012/0124300 | A1 * | 5/2012 | Teyssier ................ G06F 9/34 711/154 |
| 2014/0173294 | A1 | 6/2014 | Buer |
| 2015/0089186 | A1 | 3/2015 | Kim et al. |
| 2017/0371790 | A1 * | 12/2017 | Dwiel ................ G06F 12/0811 |

FOREIGN PATENT DOCUMENTS

| | | |
|---|---|---|
| JP | H10260834 A | 9/1998 |
| JP | 2002215456 A | 8/2002 |
| JP | 2003223359 A | 8/2003 |
| TW | 201106261 A | 2/2011 |
| WO | 2014113288 A1 | 7/2014 |

OTHER PUBLICATIONS

Bekerman, Michael et al., "Correlated Load-Address Predictors," Proceedings of the 26th Annual International Symposium on Computer Architecture (ISCA '99), IEEE, 1999, 10 pages.

Bekerman, Michael et al., "Early Load Address Resolution Through Register Tracking," Proceedings of the 27th International Symposium on Computer Architecture, IEEE, Jun. 14, 2000, 12 pages.

González, José et al., "Memory Address Prediction for Data Speculation," Proceedings of the Third International Euro-Par Conference on Parallel Processing, Aug. 26-29, 1997, 12 pages.

Morancho, Enric et al., "Two-Level Address Storage and Address Prediction," Euro-Par 2000 Parallel Processing, Lecture Notes in Computer Science, 2000, Series vol. 1900, 5 pages.

Mutlu, Onur et al., "Address-Value Delta (AVD) Prediction: Increasing the Effectiveness of Runahead Execution by Exploiting Regular Memory Allocation Patterns," Proceedings of the 38th Annual IEEE/ACM International Symposium on Microarchitecture (Micro-38), IEEE, Nov. 12-16, 2005, 12 pages.

International Search Report and Written Opinion for PCT/US2017/020357, dated Jun. 1, 2017, 14 pages.

International Preliminary Reports on Patentability for PCT/US2017/020357, dated Mar. 12, 2018, 24 pages.

Search Report for Taiwanese Patent Application No. 106106784, dated Sep. 26, 2020, 1 page.

* cited by examiner

PROVIDING LOAD ADDRESS PREDICTIONS USING ADDRESS PREDICTION TABLES BASED ON LOAD PATH HISTORY IN PROCESSOR-BASED SYSTEMS

BACKGROUND

I. Field of the Disclosure

The technology of the disclosure relates generally to improving execution latency of load instructions during execution of a computer program by processor-based systems, and, in particular, to speeding up execution of load instructions and load-dependent instructions in a processor.

II. Background

Conventional processors are capable of fetching and executing several program instructions during every processor clock cycle. To guarantee correct execution of program instructions, a processor monitors, detects, and attempts to satisfy address and data dependencies among program instructions. For example, the processor may determine that a producer-consumer relationship exists between a load instruction and a subsequent store instruction, and, thus, may seek to ensure that a result generated by the load instruction is available before permitting the store instruction to execute.

Ensuring satisfaction of data dependencies is particularly critical with respect to load instructions, as load instructions may represent a significant fraction of the total number of program instructions that are executed by the processor. However, satisfying data dependencies for load instructions may negatively impact the execution latency of such load instructions. The speed with which a load instruction may execute can often vary depending on where the sought-after data is located in the memory hierarchy (e.g., in a Level 1 (L1) cache, a Level 2 (L2) cache, and/or a system memory, as non-limiting examples) of a processor-based system. As a general principle, the closer to the processor that data is stored, the sooner the load instruction requiring the data can execute. Consequently, this variability in data access time may negatively impact the execution latency of a load-dependent instruction (i.e., an instruction that consumes a data value produced by a previous load instruction), because the load-dependent instruction must wait until the previous load instruction is executed.

Because of this data access latency variability, conventional processor optimizations have focused on speeding up execution of load instructions (e.g., through data prefetching) and/or speeding up execution of load-dependent instruction (e.g., through data value prediction). Data prefetching involves retrieving a data value that is expected or predicted to be referenced by a load instruction into a higher cache level (e.g., an L1 cache) to enable the load instruction to execute in a more timely fashion. Data value prediction is a technique that attempts to speed up the execution of a load-dependent instruction by predicting a data value that will be produced by a previous load instruction, and allows the load-dependent instruction to execute using the predicted data value. Upon the subsequent execution of the load instruction, the predicted data value can be confirmed as valid, or disconfirmed as mispredicted. If the predicted data value is determined to be mispredicted, recovery actions are performed, including flushing and re-executing the instructions using the mispredicted data value.

While the use of data prefetching and/or data value prediction, as well as other optimizations, may result in significant performance gains, it may be desirable to provide mechanisms that further improve the performance of such optimizations.

SUMMARY OF THE DISCLOSURE

Aspects disclosed in the detailed description include providing load address predictions using address prediction tables based on load path history in processor-based systems. Such processor-based systems can include superscalar processor-based systems, as a non-limiting example. In this regard, in one exemplary aspect, a load address prediction engine is provided for predicting a memory address that may be a target of a load instruction detected in a front-end instruction pipeline of an execution pipeline of a processor. The load address prediction engine includes a load address prediction table containing a plurality of load address prediction table entries. Each of the load address prediction table entries corresponds to a detected load instruction, and includes a predictor tag field and a memory address field. Upon receiving a load instruction, the load address prediction engine generates a table index and a predictor tag based on both an identifier for the load instruction (such as a program counter) and a load path history for the load instruction. The table index is used to look up a corresponding load address prediction table entry in the load address prediction table. If the predictor tag matches the predictor tag field of the load address prediction table entry corresponding to the table index, the memory address field of the load address prediction table entry is provided as a predicted memory address for the load instruction.

In this manner, the load address prediction engine may improve processor performance by providing memory address predictions for load instructions. In some aspects, the predicted memory address may be used to access a system data cache. If a cache hit results on the system data cache, a data value for the predicted memory address may be read from the system data cache and used to perform data value prediction, thus resulting in improved processor performance. Some aspects may also provide that the predicted memory address may be provided to a back-end instruction pipeline of the execution pipeline of the processor to assist in memory disambiguation. Accordingly, in this manner, the load address prediction engine may enhance the effectiveness of conventional processor optimizations. Some aspects may also provide that each load address prediction table entry in the load address prediction table includes a cache way indicator that represents a cache way in which a memory block corresponding to the predicted memory address is expected to be present within the system data cache. By providing a cache way indicator, the need to avoid accessing all cache ways within the system data cache is avoided, thus reducing system power consumption.

In some aspects, each load address prediction table entry in the load address prediction table may also include a confidence value field. The confidence value field may represent a level of confidence, relative to a confidence threshold value field provided by the load address prediction engine, that the predicted memory address is correct for the corresponding load instruction. The confidence value field may be incremented when a predicted memory address is confirmed as correct for a load instruction. The confidence value field may be decremented if a predicted memory address is determined to be incorrect for a load instruction, or if a miss on the load address prediction table occurs and the confidence value for an existing load address prediction table entry for the load instruction is high.

In another aspect, a load address prediction engine is provided. The load address prediction engine comprises a load address prediction table configured to store a plurality of load address prediction table entries, each comprising a predictor tag field and a memory address field. The load address prediction engine is configured to receive a load instruction. The load address prediction engine is further configured to generate a table index and a predictor tag based on an identifier and a load path history indicator for the load instruction. The load address prediction engine is also configured to determine whether the predictor tag is present in a predictor tag field of a load address prediction table entry, corresponding to the table index, of the plurality of load address prediction table entries. The load address prediction engine is additionally configured to, responsive to determining that the predictor tag is present in a predictor tag field of a load address prediction table entry, corresponding to the table index, of the plurality of load address prediction table entries, provide a memory address from a memory address field of the load address prediction table entry as a predicted memory address for the load instruction.

In another aspect, a load address prediction engine of a processor is provided. The load address prediction engine comprises a means for receiving a load instruction. The load address prediction engine further comprises a means for generating a table index and a predictor tag based on an identifier and a load path history indicator for the load instruction. The load address prediction engine also comprises a means for determining whether the predictor tag is present in a predictor tag field of a load address prediction table entry, corresponding to the table index, of a plurality of load address prediction table entries of a load address prediction table of the load address prediction engine. The load address prediction engine additionally comprises a means for providing a memory address from a memory address field of the load address prediction table entry as a predicted memory address for the load instruction, responsive to determining that the predictor tag is present in a predictor tag field of a load address prediction table entry, corresponding to the table index, of a plurality of load address prediction table entries of a load address prediction table of the load address prediction engine.

In another aspect, a method for providing load address predictions is provided. The method comprises receiving, by a load address prediction engine of a processor, a load instruction. The method further comprises generating a table index and a predictor tag based on an identifier and a load path history indicator for the load instruction. The method also comprises determining whether the predictor tag is present in a predictor tag field of a load address prediction table entry, corresponding to the table index, of a plurality of load address prediction table entries of a load address prediction table of the load address prediction engine. The method additionally comprises, responsive to determining that the predictor tag is present in a predictor tag field of a load address prediction table entry of the plurality of load address prediction table entries corresponding to the table index, providing a memory address from a memory address field of the load address prediction table entry as a predicted memory address for the load instruction.

In another aspect, a non-transitory computer-readable medium is provided, having stored thereon computer-executable instructions. When executed by a processor, the computer-executable instructions cause the processor to receive a load instruction. The computer-executable instructions further cause the processor to generate a table index and a predictor tag based on an identifier and a load path history indicator for the load instruction. The computer-executable instructions also cause the processor to determine whether the predictor tag is present in a predictor tag field of a load address prediction table entry, corresponding to the table index, of a plurality of load address prediction table entries of a load address prediction table. The computer-executable instructions additionally cause the processor to, responsive to determining that the predictor tag is present in a predictor tag field of a load address prediction table entry of the plurality of load address prediction table entries corresponding to the table index, provide a memory address from a memory address field of the load address prediction table entry as a predicted memory address for the load instruction.

DETAILED DESCRIPTION

Figure 1:
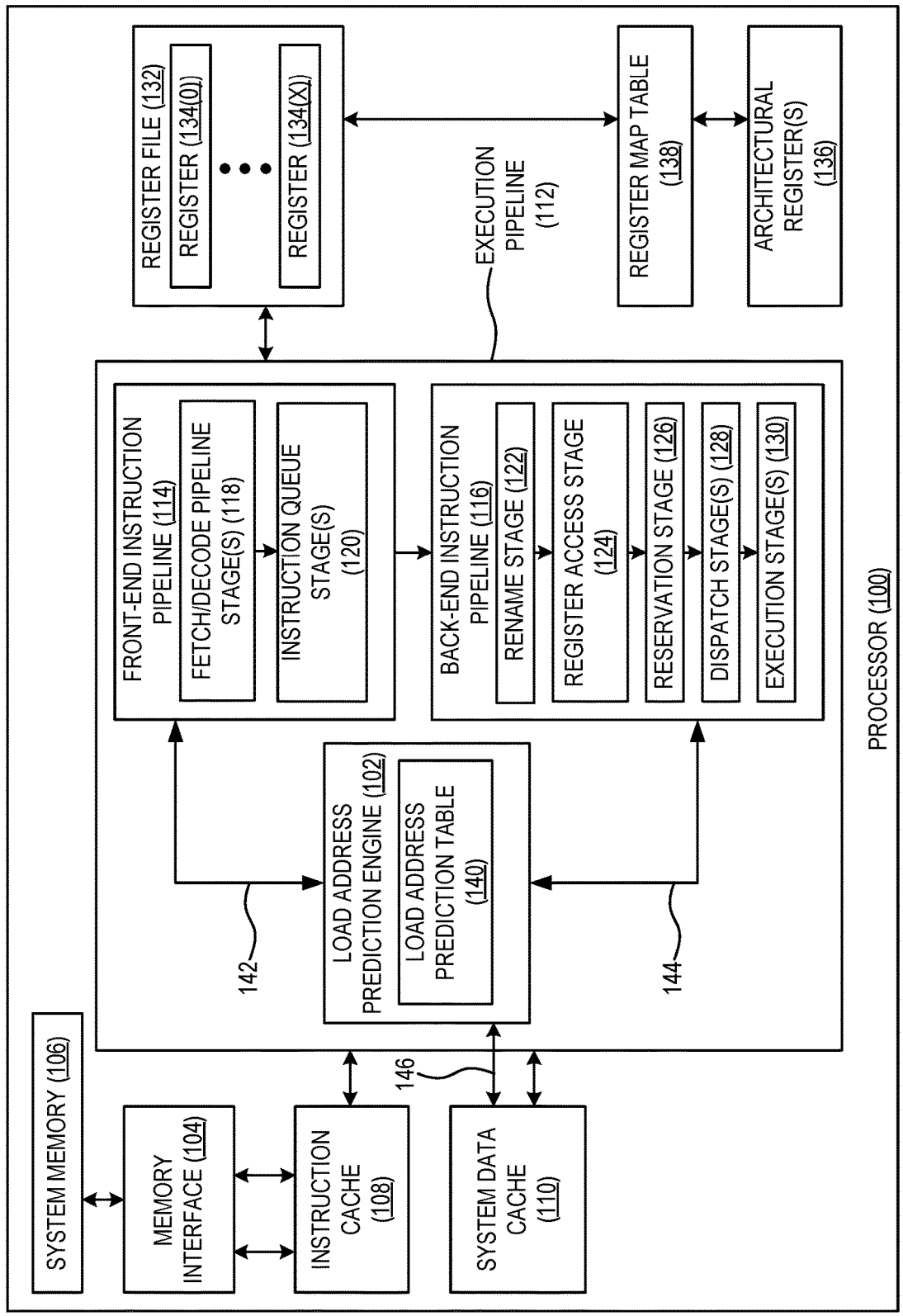
FIG. 1 is a block diagram of an exemplary processor including a load address prediction engine for providing load address predictions.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include providing load address predictions using address prediction tables based on load path history in processor-based systems. A load address prediction engine is provided for predicting a memory address that may be referenced by a given load instruction detected in a front-end instruction pipeline of an execution pipeline of a processor. A table index and a predictor tag are generated by the load address prediction engine based on both an identifier for the load instruction (such as a program counter) and a load path history for the load instruction. The load address prediction engine then determines whether a load address prediction table entry corresponding to the table index in a load address prediction table contains the predictor tag. If so, a memory address field of the load address prediction table entry is provided as a predicted memory address for the load instruction. As discussed in greater detail below, the predicted memory address for the load instruction may be utilized to enhance the effectiveness of processor optimizations such as data value prediction, data value prefetching, and memory disambiguation. Some aspects may provide further performance optimizations using a confidence value field in the load address prediction table entries of the load address prediction table. In some aspects, power optimizations may also be realized through the use of an optional cache way field in the load address prediction table entries of the load address prediction table.

In this regard, FIG. 1 is a block diagram of an exemplary processor 100 including a load address prediction engine 102 providing load address predictions, as disclosed herein. The processor 100 includes a memory interface 104, through which a system memory 106 may be accessed. In some aspects, the system memory 106 may comprise double-rate dynamic random access memory (DRAM) (DDR), as a non-limiting example. The processor 100 further includes an instruction cache 108, and a system data cache 110. The system data cache 110, in some aspects, may comprise a Level 1 (L1) data cache. The processor 100 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages.

The processor 100 further comprises an execution pipeline 112, which may be subdivided into a front-end instruction pipeline 114 and a back-end instruction pipeline 116. As used herein, "front-end instruction pipeline 114" may refer to pipeline stages that are conventionally located at the "beginning" of the execution pipeline 112, and that provide fetching, decoding, and/or instruction queueing functionality. In this regard, the front-end instruction pipeline 114 of FIG. 1 includes one or more fetch/decode pipeline stages 118 and one or more instruction queue stages 120. As non-limiting examples, the one or more fetch/decode pipeline stages 118 may include F1, F2, and/or F3 fetch/decode stages (not shown). "Back-end instruction pipeline 116" refers herein to subsequent pipeline stages of the execution pipeline 112 for issuing instructions for execution, for carrying out the actual execution of instructions, and/or for loading and/or storing data required by or produced by instruction execution. In the example of FIG. 1, the back-end instruction pipeline 116 comprises a rename stage 122, a register access stage 124, a reservation stage 126, one or more dispatch stages 128, and one or more execution stages 130. It is to be understood that the stages 118, 120 of the front-end instruction pipeline 114 and the stages 122, 124, 126, 128, 130 of the back-end instruction pipeline 116 shown in FIG. 1 are provided for illustrative purposes only, and that other aspects of the processor 100 may contain additional or fewer pipeline stages than illustrated herein.

The processor 100 additionally includes a register file 132, which provides physical storage for a plurality of registers 134(0)-134(X). In some aspects, the registers 134(0)-134(X) may comprise one or more general purpose registers (GPRs), a program counter (not shown), and/or a link register (not shown). During execution of computer programs by the processor 100, the registers 134(0)-134(X) may be mapped to one or more architectural registers 136 using a register map table 138.

In exemplary operation, the front-end instruction pipeline 114 of the execution pipeline 112 fetches program instructions (not shown) from the instruction cache 108. Program instructions may be further decoded by the one or more fetch/decode pipeline stages 118 of the front-end instruction pipeline 114, and passed to the one or more instruction queue stages 120 pending issuance to the back-end instruction pipeline 116. After the program instructions are issued to the back-end instruction pipeline 116, stages of the back-end instruction pipeline 116 (e.g., the execution stage(s) 130)) then execute the issued program instructions, and retire the executed program instructions.

As noted above, one important function of the processor 100 is to prevent hazards by ensuring satisfaction of data dependencies among program instructions, particularly load instructions. Because variations in data access times for load instructions may negatively impact execution latency of such load instructions, conventional processors have provided optimizations such as data prefetching, data value prediction, and memory disambiguation in order to speed up execution of load instructions. However, it may be desirable to provide additional mechanisms that may further improve these optimizations.

In this regard, the processor 100 includes the load address prediction engine 102 to provide load address predictions for load instructions. While the load address prediction engine 102 is illustrated as an element separate from the front-end instruction pipeline 114 and the back-end instruction pipeline 116 for the sake of clarity, it is to be understood that the load address prediction engine 102 may be integrated into one or more of the stages 118, 120 of the front-end instruction pipeline 114 and/or one or more of the stages 122, 124, 126, 128, 130 of the back-end instruction pipeline 116. The load address prediction engine 102 comprises a load address prediction table 140, which contains one or more load address prediction table entries (not shown) for storing predicted memory addresses that may be the target of detected load instructions. As indicated by arrows 142 and 144, the load address prediction engine 102 is communicatively coupled to the front-end instruction pipeline 114 and the back-end instruction pipeline 116, respectively, of the execution pipeline 112. Similarly, the load address prediction engine 102 is communicatively coupled to the system data cache 110, as indicated by bidirectional arrow 146.

In exemplary operation, the load address prediction engine 102 receives an incoming load instruction (not shown) from the front-end instruction pipeline 114. The load address prediction engine 102 generates a table index (not shown) and a predictor tag (not shown) based on an identifier (e.g., a program counter) for the load instruction. The table index and the predictor tag for the load instruction are also based on a load path history, which represents a previous sequence of load instructions that led to the current load instruction. Incorporating the load path history into the table index and the predictor tag for the load instruction provides additional history context for the load instruction, which may result in more unique values generated for a given load instruction. As a non-limiting example, the load path history may be incorporated into the table index and the predictor tag in some aspects by generating a hash of a plurality of low order bits of a program counter of the load instruction itself, along with a plurality of bits of program counters of recent instructions (e.g., one or more most recent branch load instructions) preceding the load instruction. The table index and the predictor tag may then be derived from the resulting hash value.

The table index is used by the load address prediction engine 102 to access a load access prediction table entry within the load address prediction table 140. The predictor tag generated by the load address prediction engine 102 is then compared with the content of the predictor tag value of the load access prediction table entry corresponding to the table index. If the predictor tag matches the predictor tag value of the load address prediction table entry, a memory address value (not shown) is read from the load address prediction table entry and provided by the load address prediction engine 102 as a predicted memory address for the load instruction. The predicted memory address may then be used to facilitate load instruction optimizations such as data value prediction, data prefetching, and/or memory disambiguation, as non-limiting examples. Operations of exemplary aspects of the load address prediction engine 102 in facilitating load instruction optimizations are discussed in greater detail below with respect to FIGS. 3A-3C.

Figure 2:
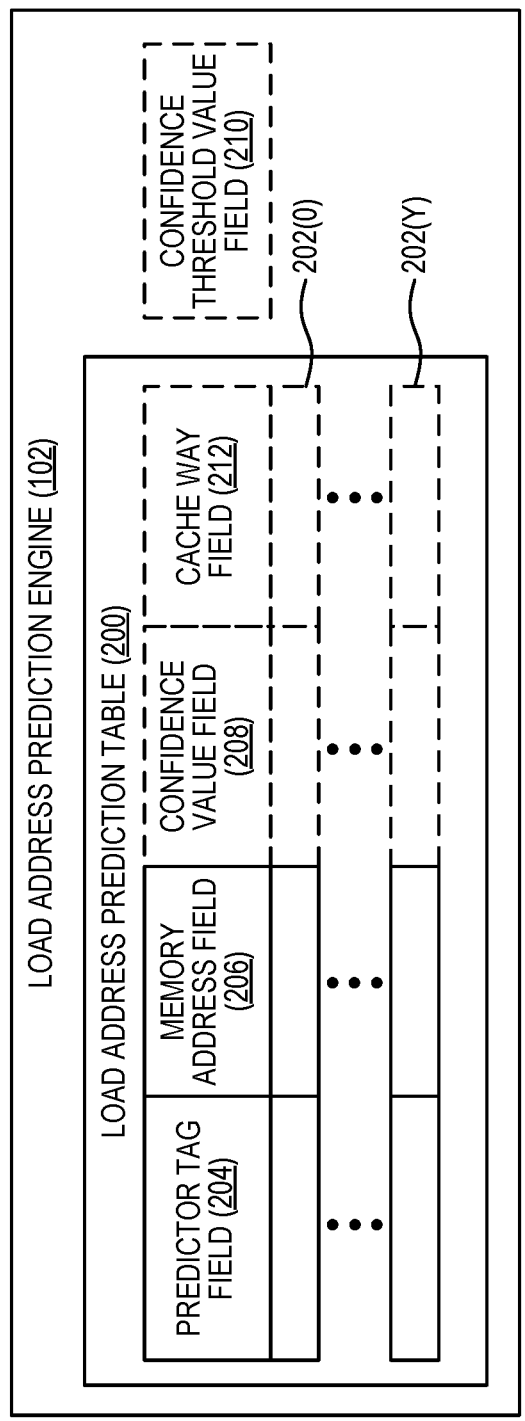
FIG. 2 is a block diagram illustrating contents of an exemplary load address prediction table of the load address prediction engine of FIG. 1.

To illustrate an exemplary load address prediction table 200 that may correspond to the load address prediction table 140 of FIG. 1 in some aspects, FIG. 2 is provided. Elements of FIG. 1 are referenced for the sake of clarity in describing FIG. 2. As seen in FIG. 2, the load address prediction engine 102 provides a load address prediction table 200 that includes multiple load address prediction table entries 202(0)-202(Y). Each of the load address prediction table entries 202(0)-202(Y) may be associated with a load instruction (not shown) detected by the load address prediction engine 102 in the front-end instruction pipeline 114 of FIG. 1. According to some aspects, in order to eliminate or reduce any aliasing issues with respect to the load address prediction table entries 202(0)-202(Y), the load address prediction table 200 may comprise a direct-mapped tagged table.

Each of the load address prediction table entries 202(0)-202(Y) includes a predictor tag field 204, which stores a predictor tag (not shown) generated for the corresponding load instruction by the load address prediction engine 102. As noted above, the contents of each predictor tag field 204 may be generated by the load address prediction engine 102 based on an identifier for the load instruction (such as a PC) in combination with a load path history for the load instruction. In some aspects, the predictor tag may further incorporate a branch direction history (not shown) and/or a branch path history (not shown) to provide further historical context for the corresponding load instruction.

Each load address prediction table entries 202(0)-202(Y) also includes a memory address field 206. The memory address field 206 is populated during training of the load address prediction table 200, and represents a memory address that was previously referenced by the load instruction corresponding to the load address prediction table entries 202(0)-202(Y). Upon a hit in the load address prediction table 200, the contents of the memory address field 206 may be provided by the load address prediction engine 102 as a predicted memory address for the load instruction for data value prediction, data value prefetching, and/or memory disambiguation optimization procedures.

To provide further performance optimizations, each of the load address prediction table entries 202(0)-202(Y) of the load address prediction table 200 in some aspects may also provide a confidence value field 208. The load address prediction engine 102 may further provide a confidence threshold value field 210 that is preset to indicate a minimum confidence threshold. The confidence value field 208 for each of the load address prediction table entries 202(0)-202(Y) may be compared to the confidence threshold value field 210 to determine if the load address prediction table entry 202(0)-202(Y) may be considered sufficiently reliable for load address prediction. In this manner, the confidence value field 208, together with the confidence threshold value field 210, may be used as a saturating counter to indicate a confidence level in the predicted memory address for the load instruction. As a non-limiting example, upon initialization of one of the load address prediction table entries 202(0)-202(Y) such as the load address prediction table entry 202(0), the confidence value field 208 may be set to zero (0). Upon subsequent hits, the confidence value field 208 may be incremented, but the predicted memory address indicated by the memory address field 206 may not be provided until the confidence value field 208 exceeds the confidence threshold value field 210. Conversely, if a predicted memory address is provided for a load instruction but is subsequently determined to be mispredicted, the confidence value field 208 may be decremented or reset to zero (0).

Some aspects of the load address prediction table 200 may provide additional power optimizations by including an optional cache way field 212 in each of the load address prediction table entries 202(0)-202(Y). The cache way field 212 may indicate a way within the system data cache 110 in which data corresponding to the memory address field 206 is located. In the event that a predicted memory address from the memory address field 206 is used for data value prediction, the cache way field 212 may be provided to more efficiently retrieve data for the predicted memory address from a specific way within the system data cache 110, rather than requiring multiple sets to be read within the system data cache 110.

It is to be understood that some aspects may provide that the load address prediction table entries 202(0)-202(Y) of the load address prediction table 200 may include other fields in addition to the fields 204, 206, 208, and 212 illustrated in FIG. 2. It is to be further understood that the load address prediction table 200 in some aspects may be implemented as a cache configured according to associativity and replacement policies known in the art. In the example of FIG. 2, the load address prediction table 200 is illustrated as a single data structure. However, in some aspects, the load address prediction table 200 may also comprise more than one (1) data structure or cache.

Figure 3A:
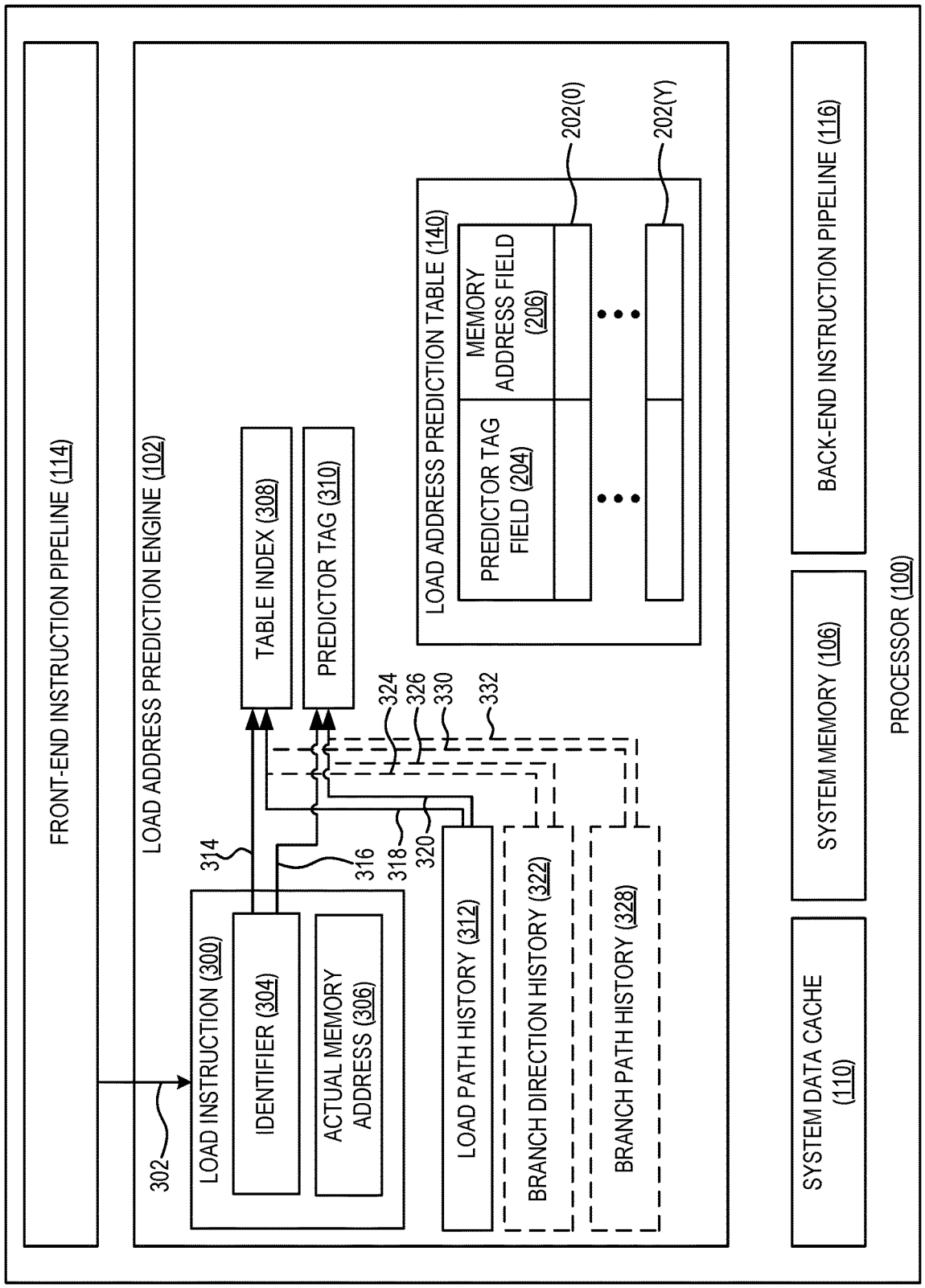
FIGS. 3A-3C are diagrams illustrating exemplary communications flows for the load address prediction engine of FIG. 1 for detecting incoming load instructions and providing load address predictions to enable data value prediction, data value prefetching, and/or memory disambiguation.
Figure 3B:
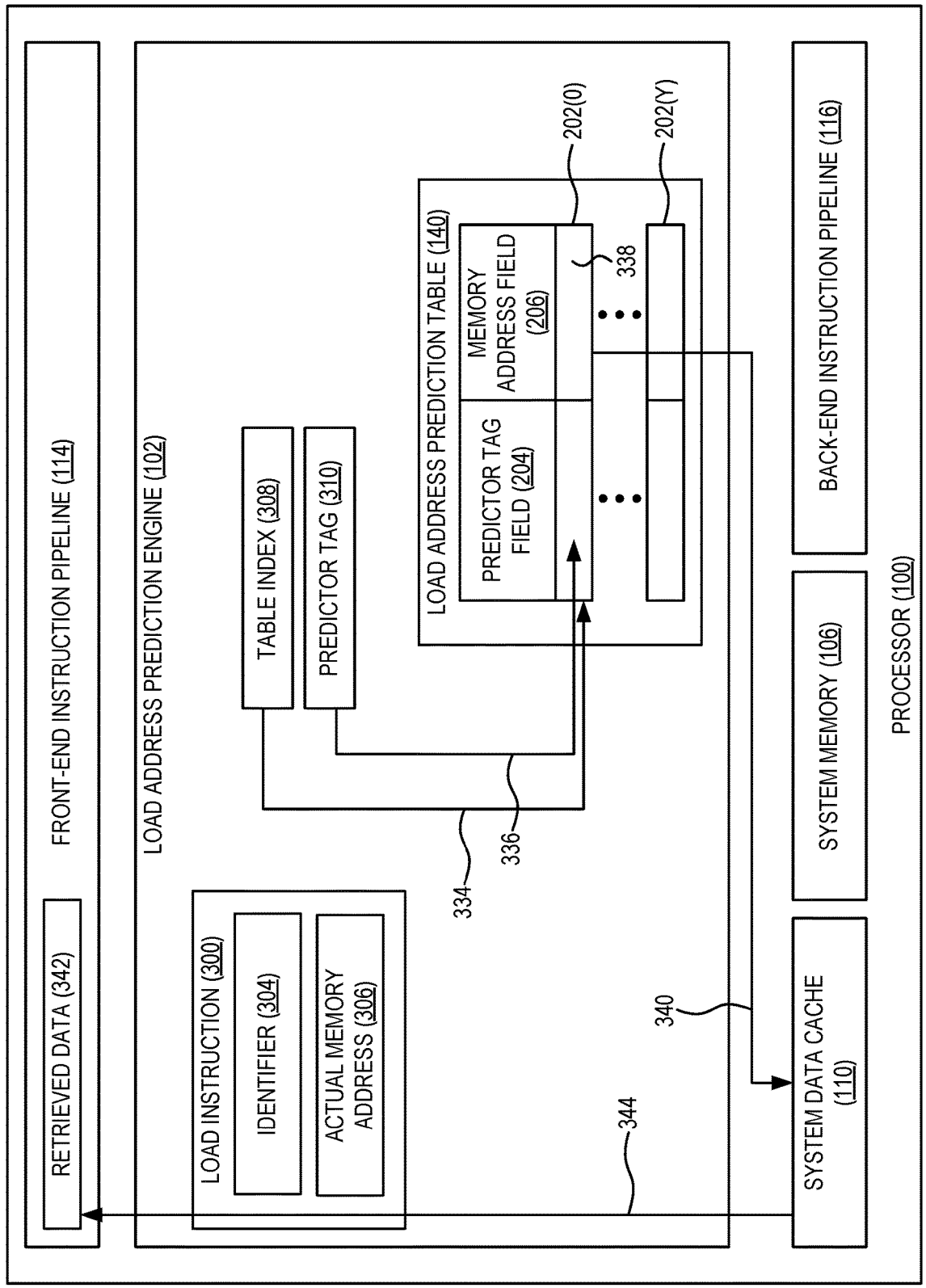
Figure 3C:
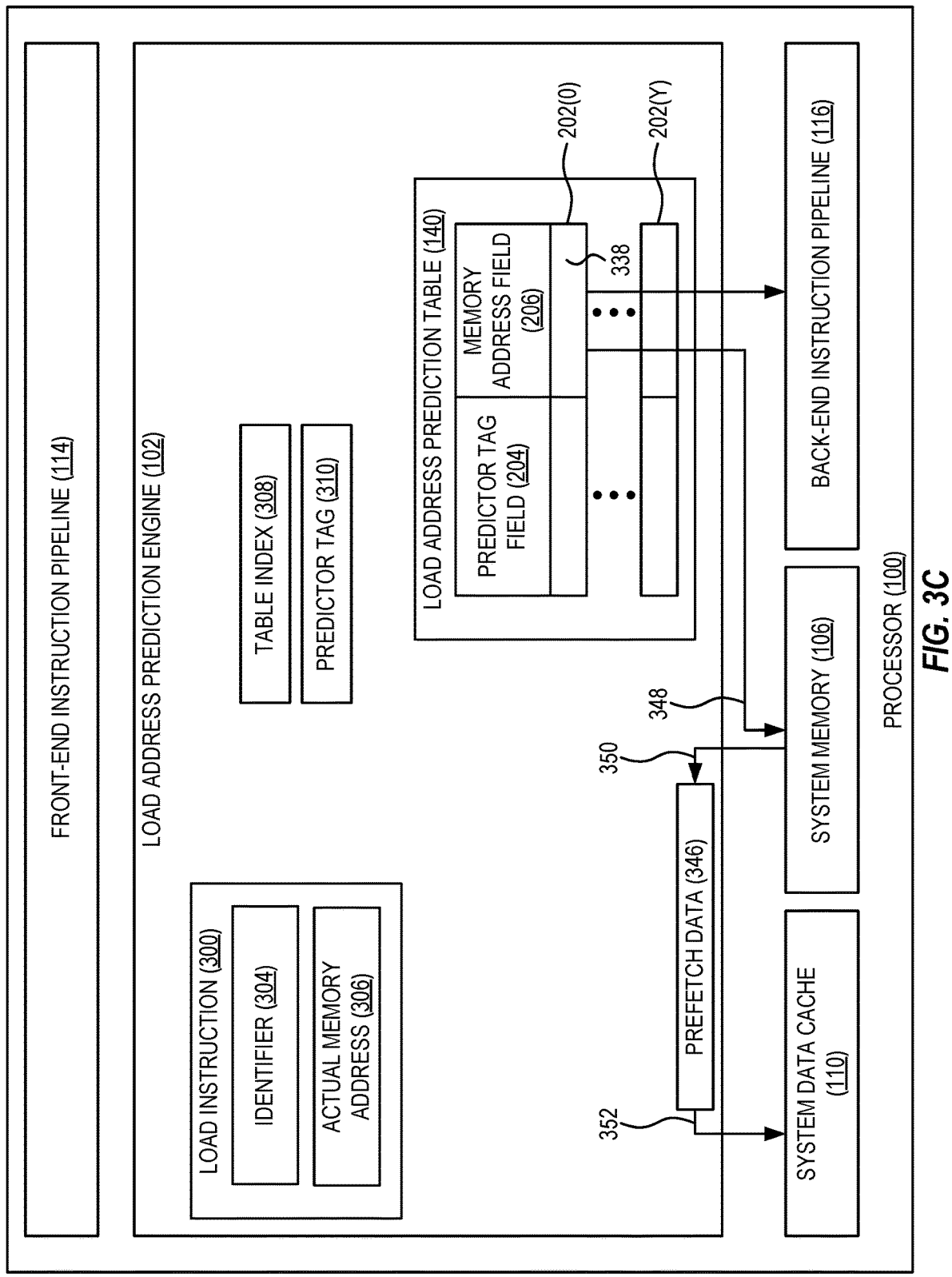

To illustrate exemplary communications flows for the load address prediction engine 102 of FIG. 1 for detecting incoming load instructions and providing load address predictions, FIGS. 3A-3C are provided. FIG. 3A illustrates exemplary communications flows for detecting a load instruction, generating a table index and a predictor tag for the load instruction. FIG. 3B illustrates exemplary communications flows for performing a lookup in the load address prediction table 140 of FIG. 1, and providing a data value prediction based on a hit in the load address prediction table 140. FIG. 3C illustrates exemplary communications flows performing a data value prefetch based on a miss in the system data cache 110, and/or providing a predicted memory address for memory disambiguation. It is to be understood that, for purposes of illustration, it is assumed that the load address prediction table 140 of FIGS. 3A-3C has already undergone training, as described in greater detail below with respect to FIG. 4C. For the sake of clarity, elements of FIGS. 1 and 2 are referenced in describing FIGS. 3A-3C.

In FIG. 3A, the load address prediction engine 102 receives a load instruction 300 from the front-end instruction pipeline 114, as indicated by arrow 302. The load instruction 300 includes an identifier 304, which may comprise a program counter, as a non-limiting example. The load instruction 300 also includes a reference referred to as an "actual memory address 306," which is the memory address to be computed as the address that the instruction 300 intends to access. Because the actual memory address 306 may not be definitively determined until much later in the execution pipeline 112, the load address prediction engine 102 is used to generate a predicted memory address (not shown) in an attempt to optimize system performance and power consumption.

After receiving the load instruction 300, the load address prediction engine 102 generates a table index 308 and a predictor tag 310. The load address prediction engine 102 bases the table index 308 and the predictor tag 310 on the identifier 304 and the load path history 312 of the load instruction 300, as indicated by arrows 314, 316 and arrows 318, 320. In some aspects, additional historical context may be incorporated into the table index 308 and the predictor tag 310 through the use of a branch direction history 322 (as indicated by arrows 324 and 326) and/or a branch path history 328 (as indicated by arrows 330 and 332). Once the table index 308 and the predictor tag 310 have been generated, operations continue with FIG. 3B.

In FIG. 3B, the load address prediction engine 102 uses the table index 308 as an index into the load address prediction table 140, as indicated by arrow 334. In this example, the table index 308 corresponds to the load address prediction table entry 202(0). The load address prediction engine 102 then compares the predictor tag 310 with the contents of the predictor tag field 204 of the load address prediction table entry 202(0), as indicated by arrow 336. If the predictor tag 310 does not match the contents of the predictor tag field 204 (i.e., a miss on the load address prediction table 140), then the load address prediction table 140 does not contain a predicted memory address for the load instruction 300, and processing of the load instruction 300 proceeds conventionally. As described below with respect to FIG. 4C, after execution of the load instruction 300, the load address prediction table 140 may be updated based on the results of executing the load instruction 300.

If the predictor tag 310 does match the contents of the predictor tag field 204, the load address prediction engine 102 uses the memory address field 206 of the load address prediction table entry 202(0) to provide a predicted memory address 338 for the load instruction 300. As noted above, in aspects in which the load address prediction table 140 employs a confidence value field 208 in conjunction with the confidence threshold value field 210, the load address prediction engine 102 may provide the predicted memory address 338 only if the confidence value field 208 exceeds the confidence threshold value field 210.

In some aspects, the predicted memory address 338 may be used to determine whether data for the predicted memory address 338 exists in the system data cache 110, as indicated by arrow 340. If a hit occurs on the system data cache 110 for the predicted memory address 338, retrieved data 342 corresponding to the predicted memory address 338 is read from the system data cache 110. The retrieved data 342 is provided to the front-end instruction pipeline 114 as a data value prediction, as indicated by arrow 344.

Referring now to FIG. 3C, if a miss occurs in the system data cache 110 for the predicted memory address 338, the load address prediction engine 102 may facilitate a data value prefetch for the predicted memory address 338. To do so, prefetch data 346 corresponding to the predicted memory address 338 may be read from the system memory 106, as indicated by arrow 348. The prefetch data 346 is then stored in conjunction with the predicted memory address 338 in the system data cache 110, as indicated by arrows 350 and 352. In this manner, the prefetch data 346 may be available in the system data cache 110 in the event of a future hit on the predicted memory address 338 in the system data cache 110.

In some aspects, the predicted memory address 338 may also be provided to the back-end instruction pipeline 116 to be used with existing mechanisms to improve memory disambiguation. In memory disambiguation, the computed address of a load instruction, such as the load instruction 300, is checked against the computed addresses of older store instructions (not shown). If the address of the load instruction 300 matches the address of a prior store instruction, the load instruction 300 must wait for the store instruction's data to become available for use, instead of probing the system data cache 110. As the load address prediction table 140 is trained using the addresses of the load instruction 300, it may be used to help predict a load or store address before a load or store address is computed. This, in turn, may enable more efficient execution of load instructions.

Figure 4A:
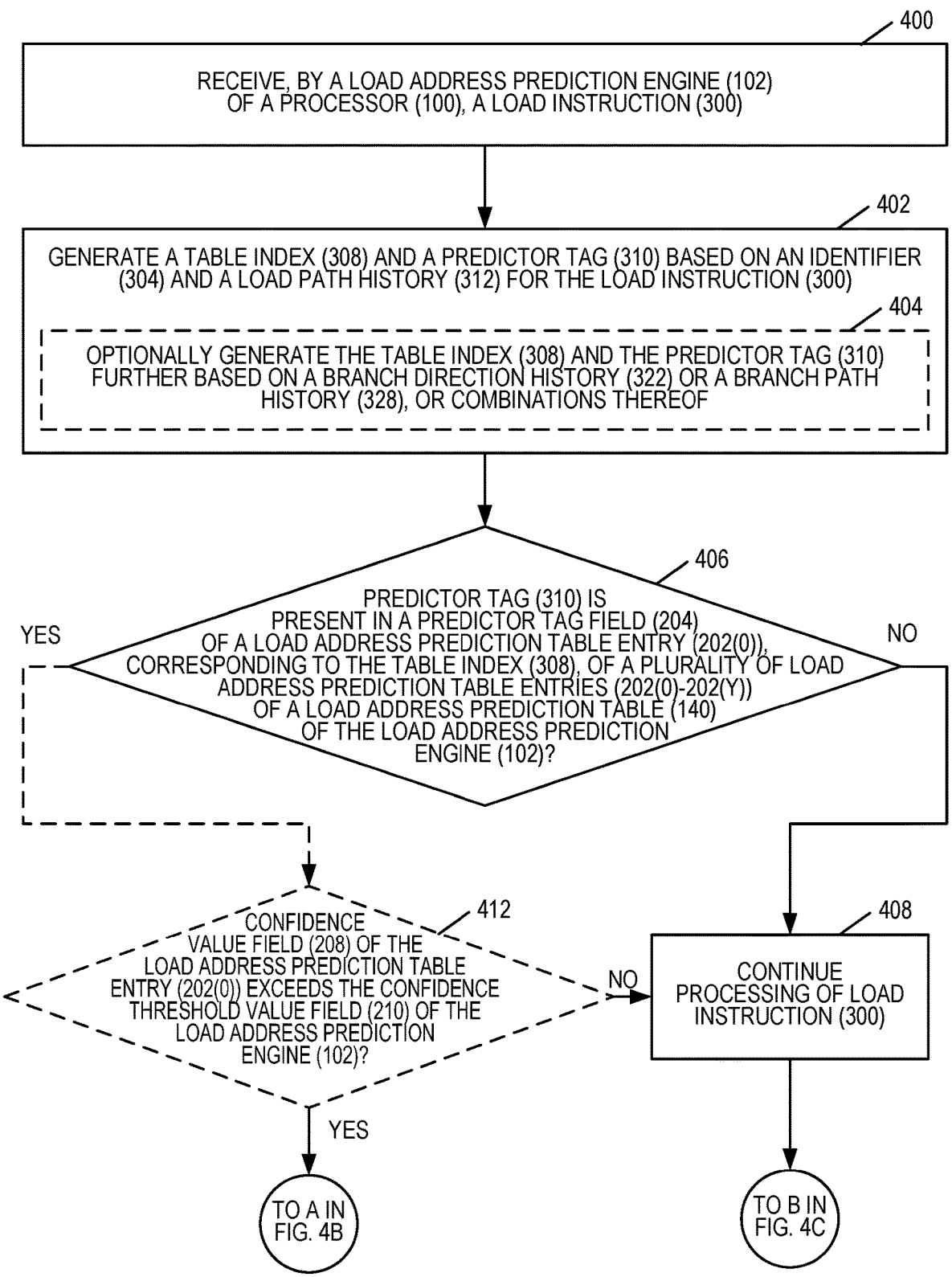
FIGS. 4A-4C are flowcharts illustrating an exemplary process for detecting incoming load instructions and providing load address predictions, and for training a load address prediction table by the load address prediction engine of FIG. 1.
Figure 4B:
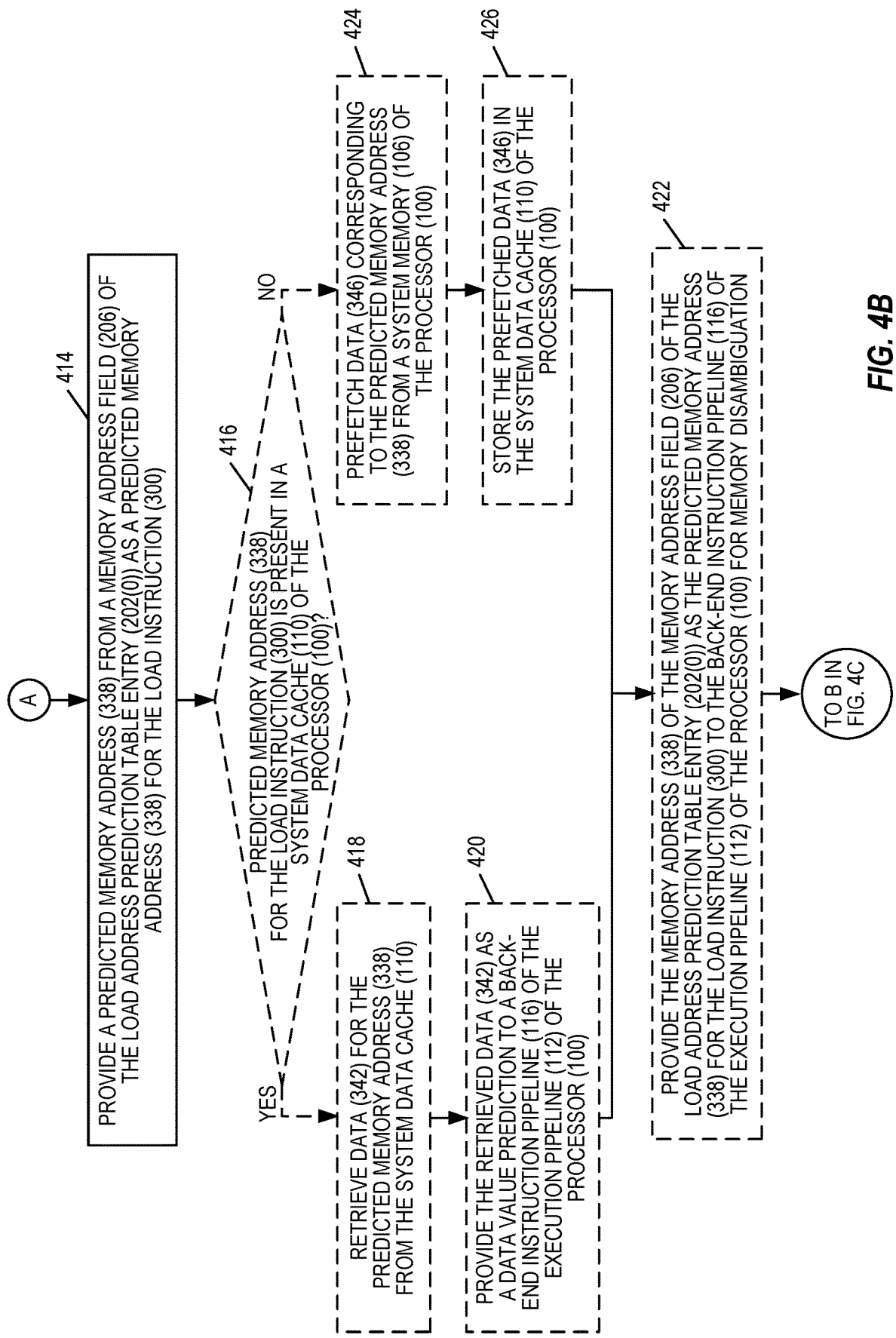
Figure 4C:
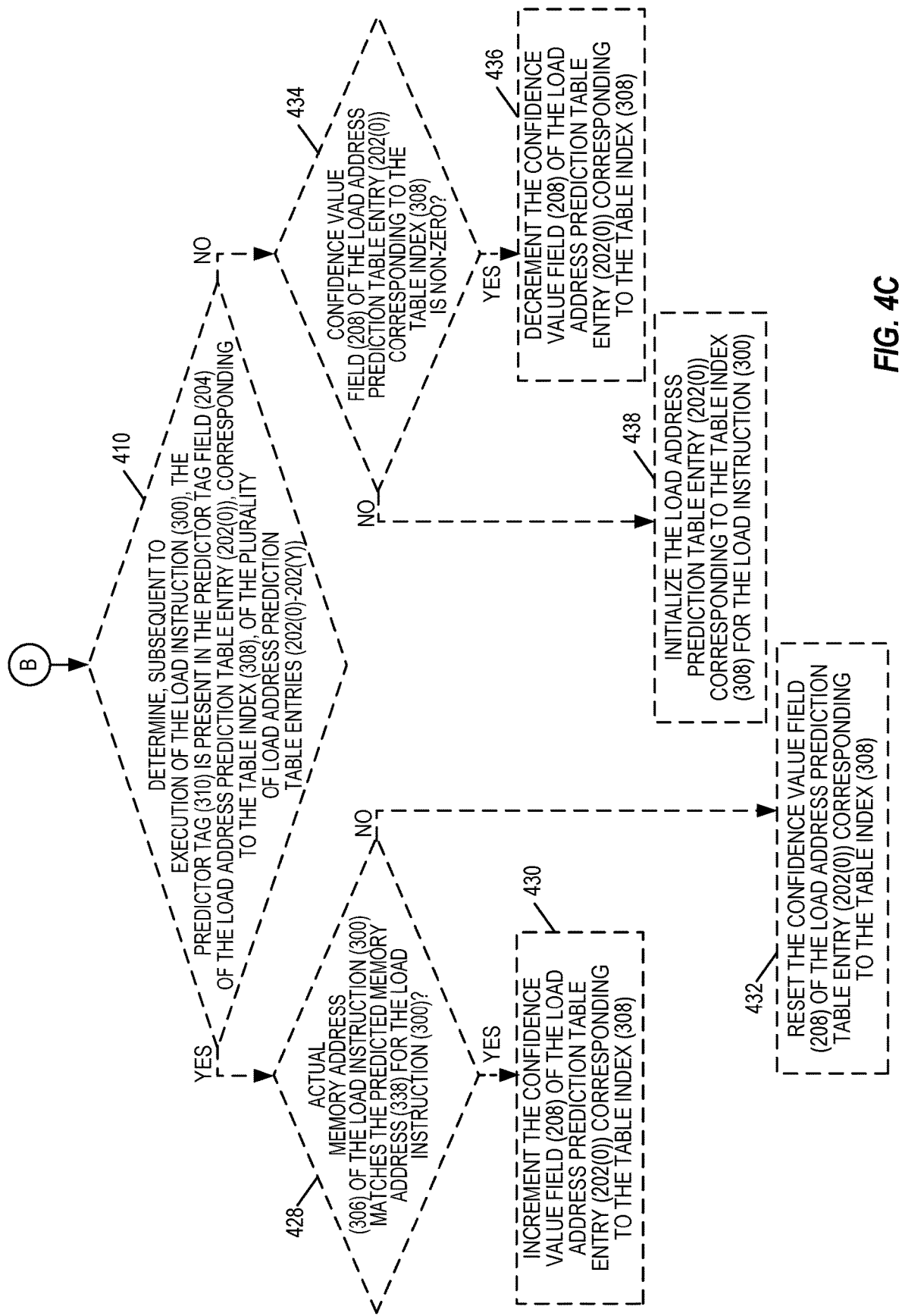

FIGS. 4A-4C are flowcharts illustrating an exemplary process for detecting incoming load instructions and providing load address predictions and for training the load address prediction table 140 by the load address prediction engine 102 of FIG. 1. For the sake of clarity, elements of FIGS. 1, 2, and 3A-3C are referenced in describing FIGS. 4A-4C. Operations begin in FIG. 4A with the load address prediction engine 102 of the processor 100 receiving the load instruction 300 (e.g., from the front-end instruction pipeline 114 of the execution pipeline 112 of the processor 100) (block 400). In this regard, the load address prediction engine 102 may be referred to herein as "a means for receiving a load instruction." The load address prediction engine 102 generates the table index 308 and the predictor tag 310 based on the identifier 304 and the load path history 312 for the load instruction 300 (block 402). Accordingly, the load address prediction engine 102 may be referred to herein as "a means for generating a table index and a predictor tag based on an identifier and a load path history indicator for the load instruction." In some aspects, operations of block 402 for generating the table index 308 and the predictor tag 310 may be further based on the branch direction history 322 and/or the branch path history 328 of the load instruction 300 (block 404).

The load address prediction engine 102 then determines whether the predictor tag 310 is present in a predictor tag field 204 of a load address prediction table entry 202(0), corresponding to the table index 308, of the plurality of load address prediction table entries 202(0)-202(Y) of the load address prediction table 140 of the load address prediction engine 102 (block 406). The load address prediction engine 102 may thus be referred to herein as "a means for determining whether the predictor tag is present in a predictor tag field of a load address prediction table entry, corresponding to the table index, of a plurality of load address prediction table entries of a load address prediction table of the load address prediction engine." If the predictor tag 310 is not present in the predictor tag field 204 of the load address prediction table entry 202(0) corresponding to the table index 308, processing of the load instruction 300 continues (block 408). Processing then resumes at block 410 of FIG. 4C.

However, if the load address prediction engine 102 determines at decision block 406 that the predictor tag 310 is present in the predictor tag field 204 of the load address prediction table entry 202(0) corresponding to the table index 308, the load address prediction engine 102 in some aspects may further determine whether the confidence value field 208 of the load address prediction table entry 202(0) exceeds the confidence threshold value field 210 of the load address prediction engine 102 (block 412). If so (or if the aspect of the load address prediction engine 102 does not utilize the confidence value field 208 and the confidence threshold value field 210), processing resumes at block 414 of FIG. 4B. If the load address prediction engine 102 determines at block 412 that the confidence value field 208 does not exceed the confidence threshold value field 210, processing of the load instruction 300 continues (block 408). Processing then resumes at block 410 of FIG. 4C.

Referring now to FIG. 4B, the load address prediction engine 102 provides the predicted memory address 338 from a memory address field 206 of the load address prediction table entry 202(0) as a predicted memory address 338 for the load instruction 300 (block 414). In this regard, the load address prediction engine 102 may be referred to herein as "a means for providing a memory address from a memory address field of the load address prediction table entry as a predicted memory address for the load instruction, responsive to determining that the predictor tag is present in a predictor tag field of a load address prediction table entry, corresponding to the table index, of a plurality of load address prediction table entries of a load address prediction table of the load address prediction engine." Some aspects may provide that the load address prediction engine 102 next determines whether the predicted memory address 338 for the load instruction 300 is present in the system data cache 110 of the processor 100 (block 416). In aspects in which the load address prediction table entry 202(0) includes an optional cache way field 212, the determination made in decision block 416 may be based in part on the cache way field 212 of the load address prediction table entry 202(0) corresponding to the table index 308. If the predicted memory address 338 is present in the system data cache 110, the load address prediction engine 102 retrieves data 342 for the predicted memory address 338 from the system data cache 110 (block 418). The retrieved data 342 is then provided as a data value prediction to the back-end instruction pipeline 116 of the execution pipeline 112 of the processor 100 (block 420). Processing may then resume at block 422 of FIG. 4B.

If the load address prediction engine 102 determines at decision block 416 of FIG. 4B that the predicted memory address 338 for the load instruction 300 is not present in the system data cache 110 of the processor 100, the load address prediction engine 102 may prefetch data 346 corresponding to the predicted memory address 338 from the system memory 106 of the processor 100 (block 424). The prefetched data 346 is then stored in the system data cache 110 of the processor 100 (block 426). Processing then resumes at block 422 of FIG. 4B.

With continuing reference to FIG. 4B, the load address prediction engine 102 in some aspects may also provide the memory address 338 of the memory address field 206 of the load address prediction table entry 202(0) as the predicted memory address 338 for the load instruction 300 to the back-end instruction pipeline 116 of the execution pipeline 112 of the processor 100 for memory disambiguation (block 422). Processing then continues at block 410 of FIG. 4C.

Turning now to FIG. 4C, the load address prediction engine 102 carries out operations for training the load address prediction table 140 after execution of the load instruction 300. The load address prediction engine 102 first determines, subsequent to execution of the load instruction 300, whether the predictor tag 310 is present in the predictor tag field 204 of the load address prediction table entry 202(0)), corresponding to the table index 308, of the plurality of load address prediction table entries 202(0)-202(Y (block 410). If so, then a load address prediction table entry 202(0) exists for the load instruction 300, and should be updated based on the results of the execution of the load instruction 300.

Accordingly, the load address prediction engine 102 next determines whether the actual memory address 306 (i.e., the computed address) of the load instruction 300 matches the predicted memory address 338 for the load instruction 300 (block 428). In some aspects, the load address prediction engine 102 may also compare the way of the actual memory address 306 with the cache way field 212. If the actual memory address 306 matches the predicted memory address 338 (and, optionally, if the cache way field 212 is correct), the load address prediction engine 102 may increment the confidence value field 208 of the load address prediction table entry 202(0) corresponding to the table index 308 (block 430). However, if the actual memory address 306 does not match the predicted memory address 338, the load address prediction engine 102 resets the confidence value field 208 of the load address prediction table entry 202(0) corresponding to the table index 308 (block 432). Note that in the unlikely event that the actual memory address 306 matches the predicted memory address 338 but the cache way field 212 is incorrect, the load address prediction engine 102 updates the cache way field 212.

If the load address prediction engine 102 determines at decision block 410 that the predictor tag 310 is not present in the predictor tag field 204 of the load address prediction table entry 202(0), corresponding to the table index 308, of the plurality of load address prediction table entries 202(0)-202(Y), then a load address prediction table entry 202(0) does not appear to exist for the load instruction 300. The load address prediction engine 102 next determines whether the confidence value field 208 of the load address prediction table entry 202(0) corresponding to the table index 308 is non-zero (block 434). If so, the mismatch with the predictor tag 310 may be a transient condition, so the load address prediction engine 102 decrements the confidence value field 208 of the load address prediction table entry 202(0) corresponding to the table index 308 (block 436). If the load address prediction engine 102 determines at decision block 434 that the confidence value field 208 of the load address prediction table entry 202(0) corresponding to the table index 308 is zero (0)), the load address prediction engine 102 initializes the load address prediction table entry 202(0) corresponding to the table index 308 using the predictor tag 310 and the actual memory address 306 for the load instruction 300 (block 438).

Providing load address prediction using address prediction tables based on load path history in processor-based systems according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a smart phone, a tablet, a phablet, a server, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile.

Figure 5:
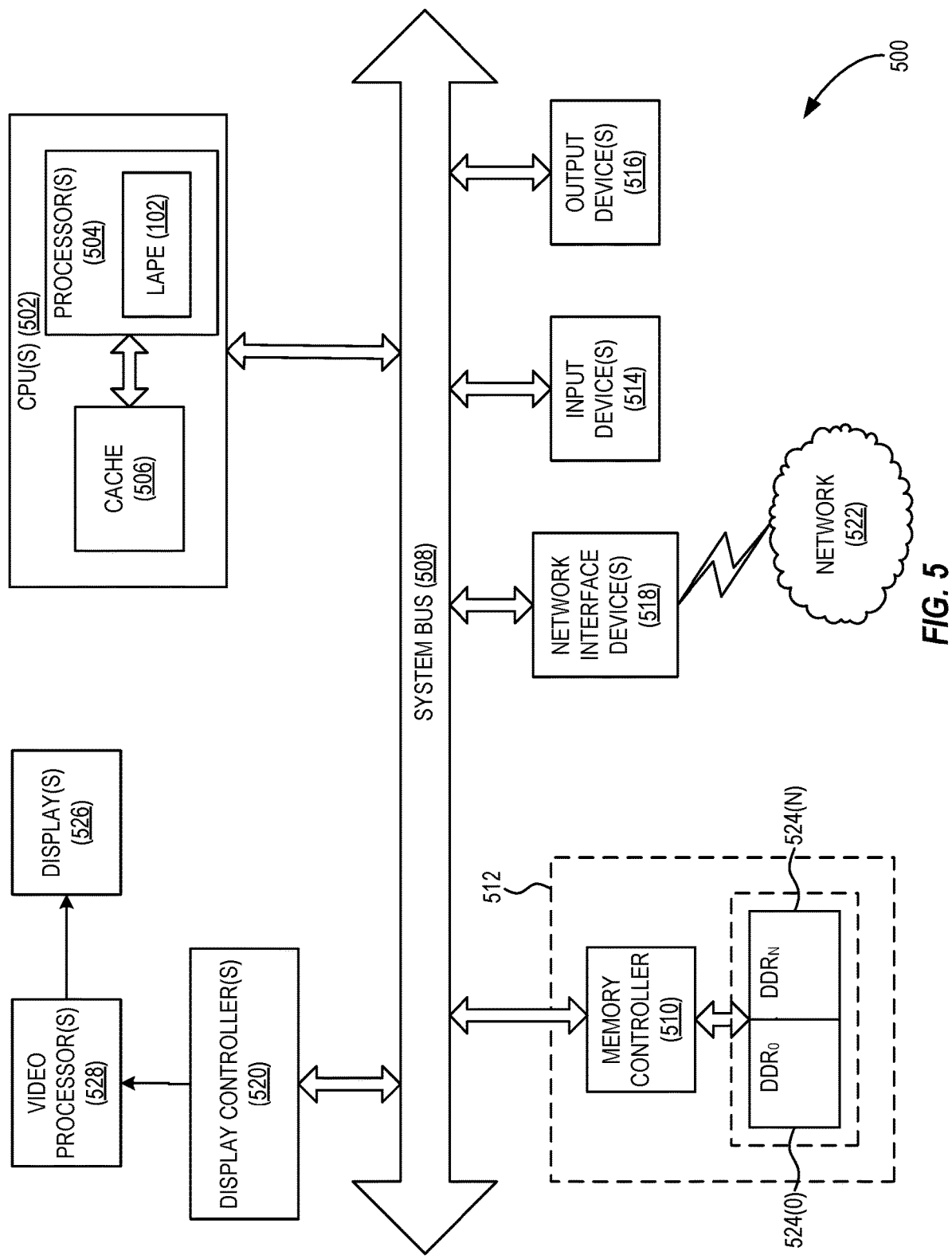
FIG. 5 is a block diagram of an exemplary processor-based system that can include the load address prediction engine of FIG. 1.

In this regard, FIG. 5 illustrates an example of a processor-based system 500 that can employ the load address prediction engine (LAPE) 102 of FIG. 1. In this example, the processor-based system 500 may correspond to the processor 100 of FIG. 1, and includes one or more CPUs 502, each including one or more processors 504. The CPU(s) 502 may have cache memory 506 coupled to the processor(s) 504 for rapid access to temporarily stored data. The CPU(s) 502 is coupled to a system bus 508 and can intercouple devices included in the processor-based system 500. As is well known, the CPU(s) 502 communicates with these other devices by exchanging address, control, and data information over the system bus 508. For example, the CPU(s) 502 can communicate bus transaction requests to a memory controller 510 as an example of a slave device. Although not illustrated in FIG. 5, multiple system buses 508 could be provided.

Other devices can be connected to the system bus 508. As illustrated in FIG. 5, these devices can include a memory system 512, one or more input devices 514, one or more output devices 516, one or more network interface devices 518, and one or more display controllers 520, as examples. The input device(s) 514 can include any type of input device, including but not limited to input keys, switches, voice processors, etc. The output device(s) 516 can include any type of output device, including but not limited to audio, video, other visual indicators, etc. The network interface device(s) 518 can be any devices configured to allow exchange of data to and from a network 522. The network 522 can be any type of network, including but not limited to a wired or wireless network, a private or public network, a local area network (LAN), a wide local area network, a wireless local area network, BLUETOOTH (BT), and the Internet. The network interface device(s) 518 can be configured to support any type of communications protocol desired. The memory system 512 can include one or more memory units 524(0)-524(N).

The CPU(s) 502 may also be configured to access the display controller(s) 520 over the system bus 508 to control information sent to one or more displays 526. The display controller(s) 520 sends information to the display(s) 526 to be displayed via one or more video processors 528, which process the information to be displayed into a format suitable for the display(s) 526. The display(s) 526 can include any type of display, including but not limited to a cathode ray tube (CRT), a liquid crystal display (LCD), a light emitting diode (LED) display, a plasma display, etc.

The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A load address prediction engine, comprising a load address prediction table configured to store a plurality of load address prediction table entries each comprising a predictor tag field and a memory address field, the load address prediction engine configured to:
   receive a first load instruction;
   generate a table index and a predictor tag, both based on both an identifier and a load path history indicator for the first load instruction, wherein the load path history indicator comprises an indicator generated from a hash of a program counter value of the first load instruction and a program counter value of a previous instruction that led to the first load instruction;
   determine whether the predictor tag is present in a predictor tag field of a load address prediction table entry corresponding to the table index of the plurality of load address prediction table entries; and
   responsive to determining that the predictor tag is present in the predictor tag field of the load address prediction table entry corresponding to the table index of the plurality of load address prediction table entries, provide a memory address from a memory address field of the load address prediction table entry corresponding to the table index as a predicted memory address for the first load instruction.

2. The load address prediction engine of claim 1, further configured to generate the table index and the predictor tag based on a branch direction history or a branch path history, or combinations thereof.

3. The load address prediction engine of claim 1, further configured to:

determine whether the predicted memory address for the first load instruction is present in a system data cache of a processor;

responsive to determining that the predicted memory address for the first load instruction is present in the system data cache of the processor:

retrieve data for the predicted memory address from the system data cache; and provide the retrieved data as a data value prediction to a back-end instruction pipeline of an execution pipeline of the processor; and responsive to determining that the predicted memory address for the first load instruction is not present in the system data cache of the processor:

prefetch data corresponding to the predicted memory address from a system memory of the processor; and store the prefetched data in the system data cache of the processor.

4. The load address prediction engine of claim 3, wherein:

each load address prediction table entry of the plurality of load address prediction table entries further comprises a confidence value field; and the load address prediction engine is configured to provide the memory address from the memory address field of the load address prediction table entry corresponding to the table index as the predicted memory address for the first load instruction further responsive to the confidence value field of the load address prediction table entry corresponding to the table index exceeding a confidence threshold value field of the load address prediction engine.

5. The load address prediction engine of claim 4, further configured to, subsequent to execution of the first load instruction:

responsive to determining that the predictor tag is present in the predictor tag field of the load address prediction table entry corresponding to the table index of the plurality of load address prediction table entries:

determine whether an actual memory address of the first load instruction matches the predicted memory address for the first load instruction;

responsive to determining that the actual memory address of the first load instruction matches the predicted memory address for the first load instruction, increment the confidence value field of the load address prediction table entry corresponding to the table index; and responsive to determining that the actual memory address of the first load instruction does not match the predicted memory address for the first load instruction, reset the confidence value field of the load address prediction table entry corresponding to the table index; and responsive to determining that the predictor tag is not present in the predictor tag field of the load address prediction table entry corresponding to the table index of the plurality of load address prediction table entries:

determine whether the confidence value field of the load address prediction table entry corresponding to the table index is non-zero;

responsive to determining that the confidence value field of the load address prediction table entry corresponding to the table index is non-zero, decrement the confidence value field of the load address prediction table entry corresponding to the table index; and responsive to determining that the confidence value field of the load address prediction table entry corresponding to the table index is zero (0), initialize the load address prediction table entry corresponding to the table index with the predictor tag and the actual memory address for the first load instruction.

6. The load address prediction engine of claim 3, wherein:

each load address prediction table entry of the plurality of load address prediction table entries further comprises a cache way field; and the load address prediction engine is configured to determine whether the predicted memory address for the first load instruction is present in the system data cache of the processor based on the cache way field of the load address prediction table entry corresponding to the table index of the plurality of load address prediction table entries.

7. The load address prediction engine of claim 1, configured to provide the memory address from the memory address field of the load address prediction table entry corresponding to the table index as the predicted memory address for the first load instruction to a back-end instruction pipeline of a processor for memory disambiguation.

8. The load address prediction engine of claim 1 integrated into an integrated circuit (IC).

9. The load address prediction engine of claim 1 integrated into a device selected from the group consisting of: a set top box; an entertainment unit; a navigation device; a communications device; a fixed location data unit; a mobile location data unit; a mobile phone; a cellular phone; a smart phone; a tablet; a phablet; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; and an automobile.

10. A method for providing load address predictions, comprising:

receiving, by a load address prediction engine circuit of a processor, a first load instruction;

generating a table index and a predictor tag, both based on both an identifier and a load path history indicator for the first load instruction, wherein the load path history indicator comprises an indicator generated from a hash of a program counter value of the first load instruction and a program counter value of a previous instruction that led to the first load instruction;

determining whether the predictor tag is present in a predictor tag field of a load address prediction table entry corresponding to the table index of a plurality of load address prediction table entries of a load address prediction table of the load address prediction engine circuit; and responsive to determining that the predictor tag is present in the predictor tag field of the load address prediction table entry corresponding to the table index of the plurality of load address prediction table entries, providing a memory address from a memory address field of the load address prediction table entry corresponding to the table index as a predicted memory address for the first load instruction.

11. The method of claim 10, wherein generating the table index and the predictor tag is further based on a branch direction history or a branch path history, or combinations thereof.

12. The method of claim 10, further comprising:
determining whether the predicted memory address for the first load instruction is present in a system data cache of the processor;
responsive to determining that the predicted memory address for the first load instruction is present in the system data cache of the processor:
retrieving data for the predicted memory address from the system data cache; and
providing the retrieved data as a data value prediction to a back-end instruction pipeline of an execution pipeline of the processor; and
responsive to determining that the predicted memory address for the first load instruction is not present in the system data cache of the processor:
prefetching data corresponding to the predicted memory address from a system memory of the processor; and
storing the prefetched data in the system data cache of the processor.

13. The method of claim 12, wherein:
each load address prediction table entry of the plurality of load address prediction table entries further comprises a confidence value field; and
providing the memory address from the memory address field of the load address prediction table entry corresponding to the table index as the predicted memory address for the first load instruction is further responsive to the confidence value field of the load address prediction table entry corresponding to the table index exceeding a confidence threshold value field of the load address prediction engine circuit.

14. The method of claim 13, further comprising, subsequent to execution of the first load instruction:
responsive to determining that the predictor tag is present in the predictor tag field of the load address prediction table entry corresponding to the table index of the plurality of load address prediction table entries:
determining whether an actual memory address of the first load instruction matches the predicted memory address for the first load instruction;
responsive to determining that the actual memory address of the first load instruction matches the predicted memory address for the first load instruction, incrementing the confidence value field of the load address prediction table entry corresponding to the table index; and
responsive to determining that the actual memory address of the first load instruction does not match the predicted memory address for the first load instruction, resetting the confidence value field of the load address prediction table entry corresponding to the table index; and
responsive to determining that the predictor tag is not present in the predictor tag field of the load address prediction table entry corresponding to the table index of the plurality of load address prediction table entries:
determining whether the confidence value field of the load address prediction table entry corresponding to the table index is non-zero;
responsive to determining that the confidence value field of the load address prediction table entry corresponding to the table index is non-zero, decrementing the confidence value field of the load address prediction table entry corresponding to the table index; and responsive to determining that the confidence value field of the load address prediction table entry corresponding to the table index is zero (0), initializing the load address prediction table entry corresponding to the table index for the first load instruction.

15. The method of claim 12, wherein:
each load address prediction table entry of the plurality of load address prediction table entries further comprises a cache way field; and
determining whether the predicted memory address for the first load instruction is present in the system data cache of the processor is based on the cache way field of the load address prediction table entry corresponding to the table index of the plurality of load address prediction table entries.

16. The method of claim 10, comprising providing the memory address from the memory address field of the load address prediction table entry corresponding to the table index as the predicted memory address for the first load instruction to a back-end instruction pipeline of the processor for memory disambiguation.

17. A non-transitory computer-readable medium having stored thereon computer executable instructions which, when executed by a processor, cause the processor to:
receive a first load instruction;
generate a table index and a predictor tag, both based on both an identifier and a load path history indicator for the first load instruction, wherein the load path history indicator comprises an indicator generated from a hash of a program counter value of the first load instruction and a program counter value of a previous instruction that led to the first load instruction;
determine whether the predictor tag is present in a predictor tag field of a load address prediction table entry corresponding to the table index of a plurality of load address prediction table entries of a load address prediction table; and
responsive to determining that the predictor tag is present in the predictor tag field of the load address prediction table entry corresponding to the table index of the plurality of load address prediction table entries, provide a memory address from a memory address field of the load address prediction table entry corresponding to the table index as a predicted memory address for the first load instruction.

18. The non-transitory computer-readable medium of claim 17 having stored thereon computer executable instructions which, when executed by the processor, further cause the processor to generate the table index and the predictor tag based on a branch direction history or a branch path history, or combinations thereof.

19. The non-transitory computer-readable medium of claim 17 having stored thereon computer executable instructions which, when executed by the processor, further cause the processor to:
determine whether the predicted memory address for the first load instruction is present in a system data cache of the processor;
responsive to determining that the predicted memory address for the first load instruction is present in the system data cache of the processor:
retrieve data for the predicted memory address from the system data cache; and
provide the retrieved data as a data value prediction to a back-end instruction pipeline of an execution pipeline of the processor; and responsive to determining that the predicted memory address for the first load instruction is not present in the system data cache of the processor:
prefetch data corresponding to the predicted memory address from a system memory of the processor; and
store the prefetched data in the system data cache of the processor.

20. The non-transitory computer-readable medium of claim 19 having stored thereon computer executable instructions which, when executed by the processor, further cause the processor to provide the memory address from the memory address field of the load address prediction table entry corresponding to the table index as the predicted memory address for the first load instruction responsive to a confidence value field of the load address prediction table entry corresponding to the table index exceeding a confidence threshold value field.

21. The non-transitory computer-readable medium of claim 20 having stored thereon computer executable instructions which, when executed by the processor, further cause the processor to, subsequent to execution of the first load instruction:
responsive to determining that the predictor tag is present in the predictor tag field of the load address prediction table entry corresponding to the table index of the plurality of load address prediction table entries:
determine whether an actual memory address of the first load instruction matches the predicted memory address for the first load instruction;
responsive to determining that the actual memory address of the first load instruction matches the predicted memory address for the first load instruction, increment the confidence value field of the load address prediction table entry corresponding to the table index; and
responsive to determining that the actual memory address of the first load instruction does not match the predicted memory address for the first load instruction, reset the confidence value field of the load address prediction table entry corresponding to the table index; and responsive to determining that the predictor tag is not present in the predictor tag field of the load address prediction table entry corresponding to the table index of the plurality of load address prediction table entries:
determine whether the confidence value field of the load address prediction table entry corresponding to the table index is non-zero;
responsive to determining that the confidence value field of the load address prediction table entry corresponding to the table index is non-zero, decrement the confidence value field of the load address prediction table entry corresponding to the table index; and
responsive to determining that the confidence value field of the load address prediction table entry corresponding to the table index is zero (0), initialize the load address prediction table entry corresponding to the table index with the predictor tag and the actual memory address for the first load instruction.

22. The non-transitory computer-readable medium of claim 19 having stored thereon computer executable instructions which, when executed by the processor, further cause the processor to determine whether the predicted memory address for the first load instruction is present in the system data cache of the processor based on a cache way field of the load address prediction table entry corresponding to the table index of the plurality of load address prediction table entries.

23. The non-transitory computer-readable medium of claim 17 having stored thereon computer executable instructions which, when executed by the processor, further cause the processor to provide the memory address from the memory address field of the load address prediction table entry corresponding to the table index as the predicted memory address for the first load instruction to a back-end instruction pipeline of the processor for memory disambiguation.

* * * * *